United States Patent

Doi et al.

[11] Patent Number: 5,917,495
[45] Date of Patent: Jun. 29, 1999

[54] INFORMATION PRESENTATION APPARATUS AND METHOD

[75] Inventors: Miwako Doi, Kanagawa-ken, Japan; Kenichi Mori, Cambridge, Mass.

[73] Assignee: Kabushiki Kaisha Toshiba, Kawasaki, Japan

[21] Appl. No.: 08/753,723

[22] Filed: Nov. 29, 1996

[30] Foreign Application Priority Data

Nov. 30, 1995 [JP] Japan ..................................... 7-312142

[51] Int. Cl.⁶ .................................................. G06T 15/70
[52] U.S. Cl. .......................... 345/419; 345/435; 345/474
[58] Field of Search ..................................... 345/419, 420, 345/435, 474, 475

[56] References Cited

U.S. PATENT DOCUMENTS 5,588,914  12/1996  Adamczyk ............................... 345/419
5,684,943  11/1997  Abraham et al. .................... 345/435 X
5,754,189   5/1998  Doi et al. ............................ 345/474 X

*Primary Examiner*—Cliff N. Vo
*Attorney, Agent, or Firm*—Finnegan, Henderson, Farabow, Garrett & Dunner, L.L.P.

[57] ABSTRACT

In the information presentation apparatus of the present invention, shape data of objects to be presented, shape data of the virtual environment in which the objects are presented, location data of the objects in the virtual environment are stored. A virtual environment generation section generates the virtual environment in which the objects are located in accordance with the shape data of the objects, the shape data of the virtual environment, and the location data. A position and a walking direction of a user watching the virtual environment are indicated through an indication section. A visual line direction determination section determines a visual line of the user in accordance with a slope corresponding to the position and the walking direction. A drawing section draws the virtual environment in accordance with the position and the visual line. The virtual environment is displayed on a display section.

17 Claims, 19 Drawing Sheets

| ADDRESS | OBJECT NAME | SHAPE ATTRIBUTE | COORDINATE | DETAIL DATA ADDRESS |
|---|---|---|---|---|
| $P_1$ | AMMONITE FOSSIL | PEAK POINT | (Px1, Py1, Pz1), (Px2, Py2, Pz2) | $d_1$ |
| $P_2$ | SEA LILY FOSSIL | --- | --- | $d_2$ |
| ... | ... | ... | ... | ... |
| $P_n$ | PILLAR | COLUMN | $(\ell x, \ell y, \ell z)$ | $d_n$ |
| ... | ... | ... | ... | ... |

FIG. 2

| KIND OF BACKGROUND | CONTENT DATA ADDRESS | DEPTH INFORMATION |
|---|---|---|
| SEA | $S_1$ | $\infty$ |
| BEACH | $S_2$ | $z_1$ |
| WOODS | $S_3$ | $z_2$ |
| ... | ... | ... |

FIG. 3

| KIND OF DATA | SHAPE DATA ADDRESS | COORDINATE | SCALING | POSTURE |
|---|---|---|---|---|
| AMMONITE FOSSIL | $P_1$ | $(x_1, y_1, z_1)$ | $(1, 1, 1)$ | $(\alpha_1, B_1, \delta_1)$ |
| SEA LILY FOSSIL | $P_2$ | $(x_2, y_2, z_2)$ | $(1.5, 1, 1)$ | $(\alpha_2, B_2, \delta_2)$ |
| ... | ... | ... | ... | ... |

*FIG. 4*

INFORMATION PRESENTATION APPARATUS AND METHOD

BACKGROUND OF THE INVENTION

1. Field of the Invention

The present invention relates to an information presentation apparatus and method for presenting information in a virtual environment, in which a user can feel presence as actual space.

2. Description of the Related Art

In a museum, a panel of explanation of exhibition is located near to the exhibition of object itself. For example, in case of fossil of ammonite, the fossil is located in a glass show case and a panel of explanation of the ammonite is located upper to the glass show case. However, in this exhibition, the user can not imagine that the ammonite is one kind of big shell swimming in the sea in the Mesozoic era. In addition to this, a visitor often loses interest in the exhibition because watching method of the visitor is passive.

In order to solve this problem, recently, environment situation in which the ammonite is living is represented using computer graphics. In comparison with exhibition method of panel, the user can imagine the situation of the ammonite's life when he watches an exhibition of VTR. However, in the exhibition method of VTR, the watching method of the visitor is also passive. Information presented by VTR is predetermined. Therefore it is necessary to present document information using panel in same way of prior art.

Information presentation method to record in CD-ROM instead of VTR is used. In this information presentation method, for example, when the user selects the ammonite swimming in the sea by mouse, explanation of the ammonite is displayed on screen or sound narration of the ammonite is outputted through speaker. In comparison with the information presentation method of VTR, the watching method of the visitor is active because he can select his desired object. However in the information presentation method of CD-ROM, camera position of each scene and development of the scene are predetermined. Therefore, the visitor can not watch the scene from his/her desired position and change the position of the object in virtual environment.

In order to watch the object from the user's desired position and change location of the object in space, recently, a virtual environment is constructed in three dimensional virtual space using three dimensional computer graphics (CG). In the virtual environment using three dimensional CG, the user's view position and movement direction are indicated using a two dimensional or three dimensional pointing device. For example, as for the user's view position, a magnetic sensor is attached to a head of the visitor and the view position is controlled according to the coordinate value detected from the magnetic sensor. However, in this method, there are two problems. First, the magnetic sensor is too expensive. Second, the user can not understand his/her relative position in the virtual environment when the position of the user's head changes largely and protrudes out of the display.

Therefore, a method for determining movement and view point by one indication device is considered. However, in case of method for changing a mode to indicate move destination and a mode to indicate view point, after the user's position is moved in the virtual environment by one indication device, the user's view point is changed by the same indication device. This two step operation is complicated. In case of operation of two steps without changing mode, it often happens that both move destination and the view point are changed though the user changed only the move destination. In short, change of move and change of view point affect each other. Additionally, in case the view point is fixed, the view point can not turn to the object though the user's position comes near to the object in the virtual space. In this way, in the information presentation method of the virtual environment using dimensional CG, it is impossible to control the move direction in the virtual environment in connection with the view point.

On the other hand, in case drawing speed of the virtual environment is sufficiently high, the user can easily operate his virtual position to move near to the object.

However, in case of indicating move in the virtual environment through communication system from a remote place, drawing speed is low because of transmission delay. Accordingly, it often happens that the user mistakenly understands his/her move indication being insufficient and he/she inputs superfluous indication of move. As a result, the user's virtual position can not reach his/her destination in the virtual environment. In such case, it is necessary to restrict the move of the user's virtual position to easily come near the destination. However, if the restriction is too strict, the user's virtual position can not freely move in the virtual environment.

Furthermove, another presentation method for displaying the virtual environment on a large screen in front of many visitors is used. In this method, if one visitor selects an object to display an explanation of the object, the explanation displayed on the screen blocks other visitor's view. Additionally, the visitors can know the situation of the object's life in the virtual environment. However, they can not actually understand the weight of the object or a sense of touch of the object.

SUMMARY OF THE INVENTION

It is an object of the present invention to provide an information presentation apparatus and method to determine the visual line direction to display the virtual environment as natural.

It is another object of the present invention to provide an information presentation apparatus and method to correct the advance direction of the view position along a suitable path in the virtual environment.

According to the present invention, there is provided an information presentation apparatus, comprising: data memory means for storing shape data of objects to be presented; background memory means for storing shape data of a virtual environment in which the objects are presented; location memory means for storing location data of the objects in the virtual environment; virtual environment generation means for generating the virtual environment in which the objects are located in accordance with the shape data of objects, virtual environment shape data, and the location data; indication means for indicating a position and walking direction of a user watching the virtual environment; visual line direction determination means for determining a visual line of the user in accordance with a slope corresponding to the position and the walking direction in the virtual environment; drawing means for drawing the virtual environment in accordance with the position and the visual line; and display means for displaying the virtual environment drawn by said drawing means.

Further in accordance with the present invention, there is provided an information presentation apparatus, comprising;

data memory means for storing shape data of objects to be presented; background memory means for storing shape data of a virtual environment in which the objects are presented; location memory means for storing location data of the objects in the virtual environment; virtual environment generation means for generating the virtual environment in which the objects are located in accordance with the shape data of objects, shape data of the virtual environment, the location data, and predetermined path data; indication means for indicating a position and walking direction of a user to watch the virtual environment; path control means for correcting walking a path corresponding to the position and the walking direction by comparing the walking path with the predetermined path data; drawing means for drawing the virtual environment in accordance with the corrected walking path and the position; and display means for displaying the virtual environment drawn by said drawing means.

Further in accordance with the present invention, there is provided an information presentation apparatus, comprising; data memory means for storing shape data of objects to be presented; background memory means for storing shape data of a virtual environment in which the objects are presented; location memory means for storing location data of the objects in the virtual environment; virtual environment generation means for generating the virtual environment in which the objects are located in accordance with the shape data of objects, the shape data of the virtual environment, and the location data; detail information memory means for storing detail information of each object; drawing means for drawing the virtual environment generated by said virtual environment generation means; display means for displaying the virtual environment drawn by said drawing means; operation means for indicating presentation of detail information of a selected object in the virtual environment; and presentation means for presenting the object and the detail information by said operation means.

Further in accordance with the present invention, there is provided an information presentation apparatus, comprising; virtual image control means including means for generating a virtual environment in accordance with object data and virtual space data, means for encoding the virtual environment generated by said generating means and means for transmitting the virtual environment encoded by said encoding means; detail information memory means including means for storing datail information of each object in the virtual environment, means for retrieving the detail information of object address from said storing means, and means for transmitting the detail information retrieved by said retrieving means; and user terminal means including means for decoding the encoded virtual environment transmitted by said virtual image control means, means for displaying the virtual environment decoded by said decoding means, and means for inputting a position signal to select an object in the virtual environment displayed by said displaying means; wherein generating means in said virtual image control means searches for an identifier of a selected object from the object data in accordance with the position data, the identifier of the selected object being transmitted from said virtual image control means to said detail information memory means through said user terminal means, wherein retrieving means in said detail information memory means retrieves the detail information of the selected object from said storing means in accordance with the identifier, the detail information being transmitted to said user terminal means; wherein displaying means in said user terminal means displays the detail information in addition to the displayed virtual environment.

BRIEF DESCRIPTION OF THE DRAWINGS

FIG. 2 is a content of data structure of a data memory section according to the first embodiment.

FIG. 3 is a content of data structure of a background memory section according to the first embodiment.

FIG. 4 is a content of data structure of a location memory section according to the first embodiment.

DETAILED DESCRIPTION OF THE PREFERRED EMBODIMENTS

Figure 1:
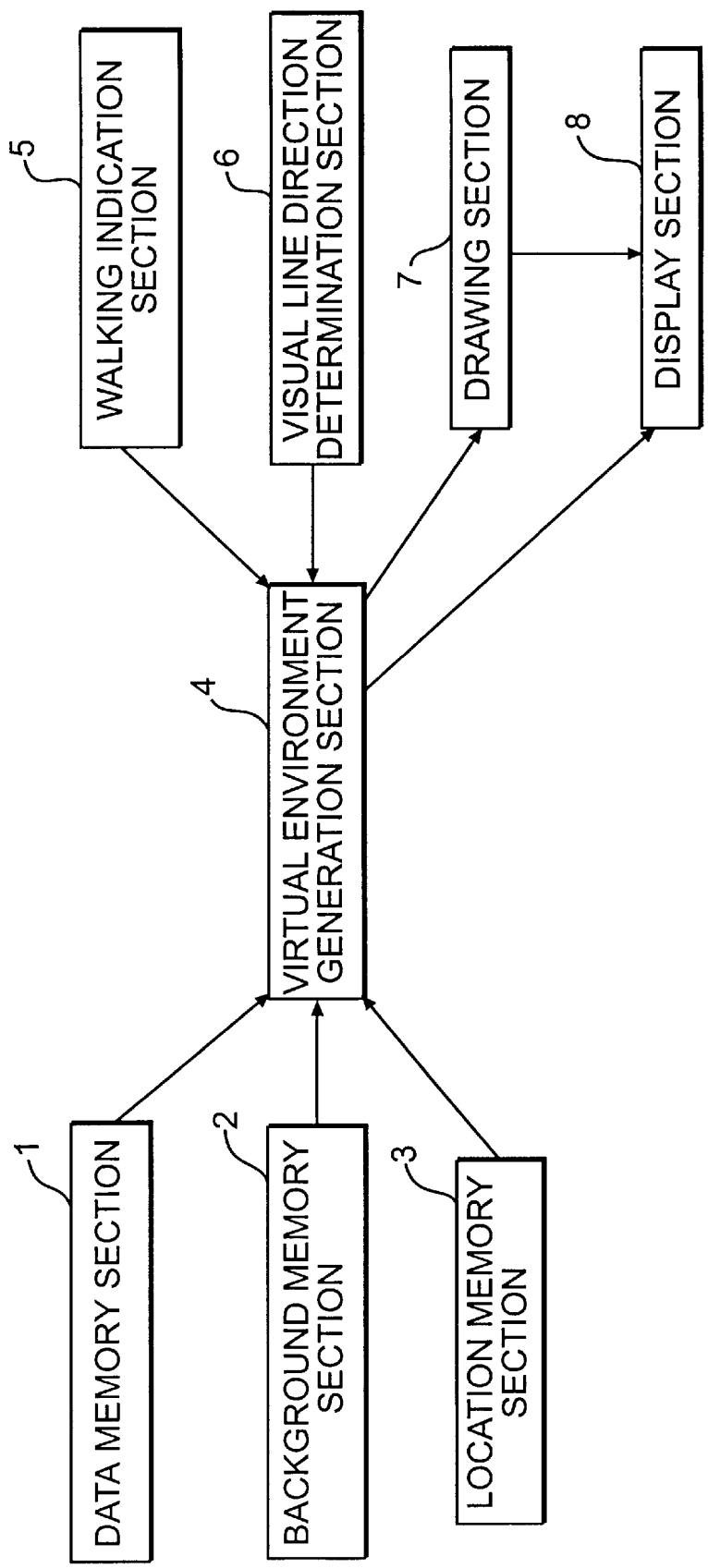
FIG. 1 is a block diagram of an information presentation apparatus according to a first embodiment of the present invention.

FIG. 1 is a block diagram of a first embodiment of the present invention for the information presentation apparatus. The first embodiment is comprised of a data memory section 1, a background memory section 2, a location memory section 3, a virtual environment generation section 4, a walking indication section 5, a visual line direction determination section 6, a drawing section 7, and a display section 8.

FIG. 2 is a content of data structure stored in the data memory section 1. As shown in FIG. 2, object data in the data memory section is comprised of object name, shape attribute, coordinate value, and detail data address by unit of object address (the detail data is not shown). In short, physical shape data of each object to be presented (for example, each kind of fossil) are stored.

FIG. 3 is a content of data structure stored in the background memory section 2. As shown in FIG. 3, the background data in the background memory section 2 is comprised of background name (kind of background), content data address, and depth information. The content data represents color and density of plane of the background to be presented (the content data is not shown). The depth information is a distance from the view point of the user to the plane of the background.

FIG. 4 is a content of data structure stored in the location memory section 3. As shown in FIG. 4, the location data of the location memory section 3 is comprised of object name (kind of data), shape data address, coordinate value, scaling value (enlarge/reduce), and posture by unit of object. The shape data address corresponds to address of the data memory section 1. The coordinate value, the scaling value and the posture value represent (x,y,z) values of each object in x-y-z axes in virtual environment when each object is located in the virtual environment. The virtual environment generation section 4 locates each object in the virtual environment to generate a three dimensional virtual environment according to data stored in the data memory section 1, the background memory section 2 and the location memory section 3.

The walking indication section 5 is, for example, a pointing device such as a mouse, a joystick, or a cursor control. A user indicates present position and walking direction in the virtual environment through the walking indication section 5. The walking direction is, for example, forward, backward, right rotation and left rotation. In other words, existence position and walking position of an avator in a three dimensional virtual environment are indicated.

The visual line direction determination section 6 determines the visual line of the user to set a view area according to an inclination of the virtual ground at the position and the walking direction indicated by the walking indication section 5. The drawing section 7 draws the virtual environment generated by the virtual environment generation section 4 according to the position indicated by the walking indication section 5 and the visual line direction determined by the visual line direction determination section 6. In short, the drawing respresents two-dimensional projection of view area of the avator in three-dimensional virtual environment. The display section 8 displays the drawing result on screen.

Next, the processing of each section in FIG. 1 will be explained in detail. FIG. 2 shows one example of shape data of each object to be presented as virtual data. For example, in case of complicated shape such as the ammonite fossil, a series of peak coordinates on the surface of a polygon are stored. On the other hand, in case of simple shape such as pillar, "column" as shape attribute and reduction ratio (lx, ly,lz) for basic column are stored. The virtual environment generation section 4 locates each object stored in the data memory section 1 into the background environment stored in the background memory section 2 according to the location value stored in the location memory section 3. In this way, the virtual environment is generated in three dimensional space. The drawing section 7 projects the three dimensional virtual environment to two dimensional screen. In this case, the view position indicated by the walking indication section 5 is represented as camera position and the visual line direction determined by the visual line direction determination section 6 is represented as camera direction. Based on the camera position and the camera direction, the drawing section 7 extracts the pixel point of each object nearest to the camera position along the camera direction in three dimensional virtual space. In short, as for each pixel of the two dimensional screen to be projected, nearest point of the objects (or the background) is determined. By changing the view position, the avator (the user) can walk (watch) freely in three dimensional virtual environment (walk through). In this case, inspite of changing the view position, if the visual line direction is not changed, it often happens that the user watches unexpected part of the virtual environment. The means to solve this defect is the visual line direction determination section 6.

Figure 5:
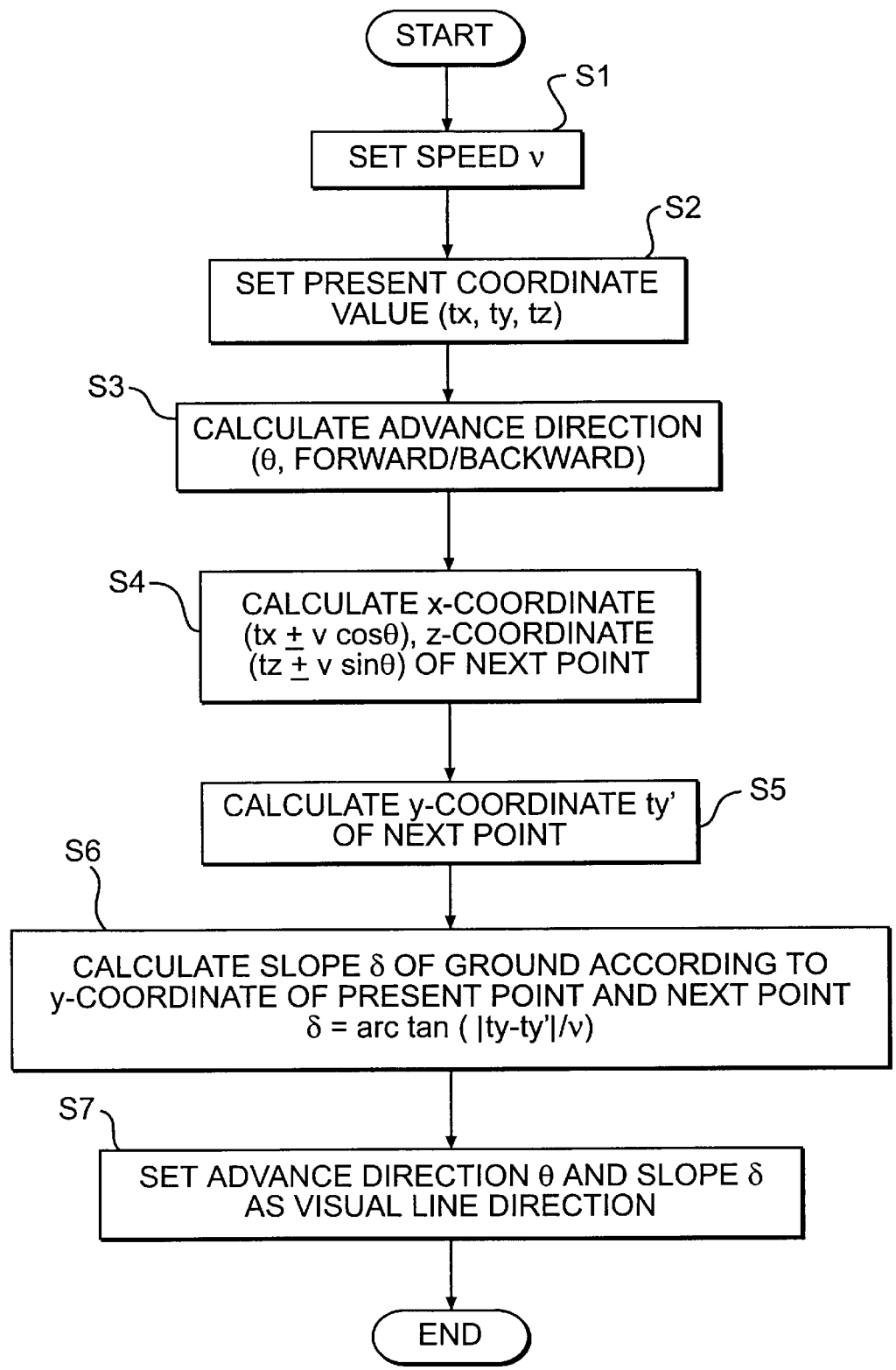
FIG. 5 is a flow chart of processing of a visual line direction determination section according to the first embodiment.

FIG. 5 is a flow chart of processing of the visual line direction determination section 6. First, walking speed of the avator in the virtual environment is set (s1). For example, assumed that speed per frame update is "v". Next, present coordinate value of the avator person (view position of the user) is set (S2). The present coordinate value is indicated by the walking indication section 5. Assumed that "(tx,ty,tz)". Next, advance direction (walking direction) is calculated according to the indication of the walking indication section 5 (S3). For example, in case of indication by mouse as pointing device, when the mouse is moved forward or backward, change angle "θ" between this moving direction and pre-walking direction is set. In this case, as indication of the walking direction, the indication for horizontal plane (for example, xz plane parallel to ground surface in the virtual environment) is effective and the indication along vertical direction is ignored. In other words, the virtual person only walks the ground surface in the virtual environment. Therefore, it does not happen that the virtual person walks along vertical direction. Then, coordinate value of next view point (next point of avator) after one frame is calculated according to the speed v and the advance direction (S4). The coordinate value of next view position is comprised of x-coordinate and z-coordinate. As a result, x-coordinate is (tx±vcos θ) and z-coordinate is (tz±vsin θ). In case of forward, "+" is used. In case of backward, "−" is used. Next, y-coordinate "ty'" of next view position is calculated using the x-coordinate and z-coordinate calculated at S4 (S5). In the above-mentioned steps, the coordinate values of present view position and next view position are determined. Then, the slope δ of ground in the virtual environment is calculated according to the coordinate values of present view position and the next view position (S6). This calculation equation is represented as follows.

$$\delta = \arctan(|ty-ty'|/v)$$

As for the visual line direction, the advance direction θ represents angle on xz plane and the slope δ represents angle along vertical direction. Therefore, the visual line direction is set as (θ, δ).

Then, the next view position is updated as the present view position and repeats step S1~step S7. In this way, the visual line direction along the slope of ground surface is set based on the view position and the advance direction.

Figure 6A:
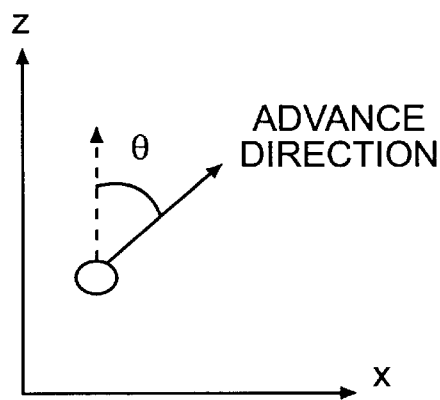
FIGS. 6A and 6B are schematic diagrams showing a process of determination of visual line direction.
Figure 6B:
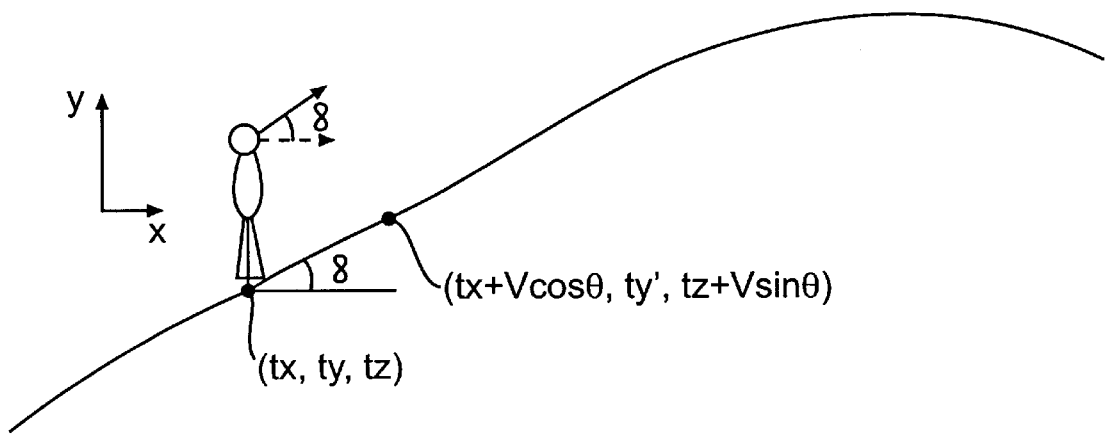

FIG. 6A shows a schematic diagram of angle "θ" between advance direction and pre-advance direction on xz plane. A dotted line is the pre-advance direction and a solid line is the advance direction indicated by the walking indication section 5. In this case, it is necessary to change the visual line direction and the angle "θ". Therefore, as shown in FIG. 6B, the visual line direction is set along the slope δ on xy plane. In short, a visual line direction from the view position (tx,ty,tz) not based on the slope δ is a dotted line direction as simple horizontal direction. In this case, it happens that the user (virtual person) watches the surface of the ground only. However, in this embodiment, the visual line direction is inclined as "δ" of the surface of the ground as shown in a solid line. The visual line direction is parallel to the surface of the ground. Therefore, the user can watch along the advance direction as natural.

Figure 7A:
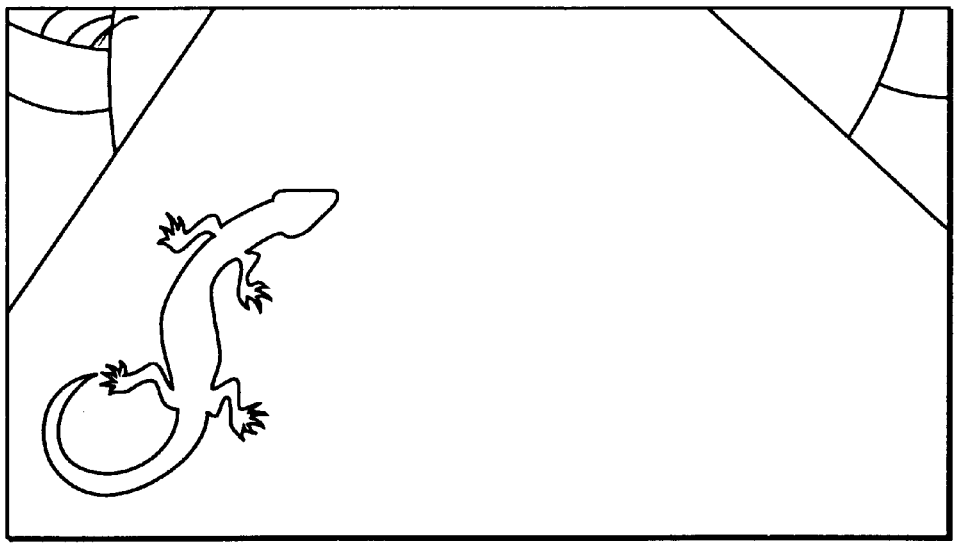
FIGS. 7A and 7B are examples of a screen in which the virtual environment is displayed.
Figure 7B:
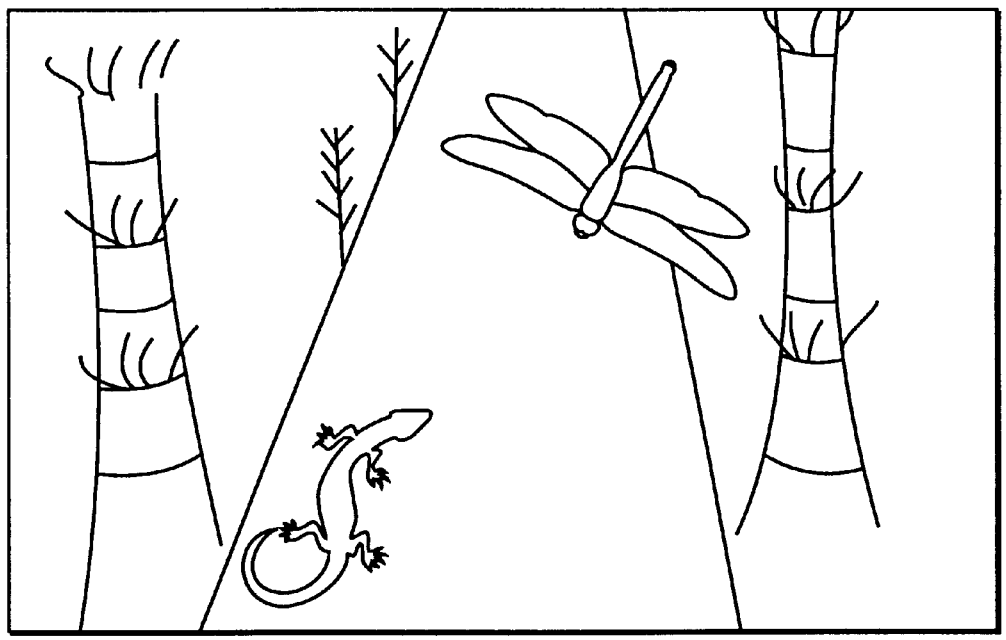

In case of the visual line direction of the dotted line in FIGS. 6A and 6B, the virtual environment is displayed as shown in FIG. 7A. In short, the surface of the background near to the avator is only displayed. However, in case of the corrected visual line direction of the solid line in FIG. 6A and 6B, the virtual environment is displayed according to the corrected visual line parallel to the surface of the background as shown in FIG. 7B. The user can watch the virtual environment as if he/she is walking along the surface of the background. For example, the view point is moved along the surface of the background while he is watching the fossil of an insect. In this situation, if the indication of explanation is supplied by the walking indication section 5, the virtual environment generation section 4 retrieves the detail information corresponding to the object located in the center of the screen (for example, in FIG. 7B, the fossil of the insect) from the data memory section 1.

Figure 8:
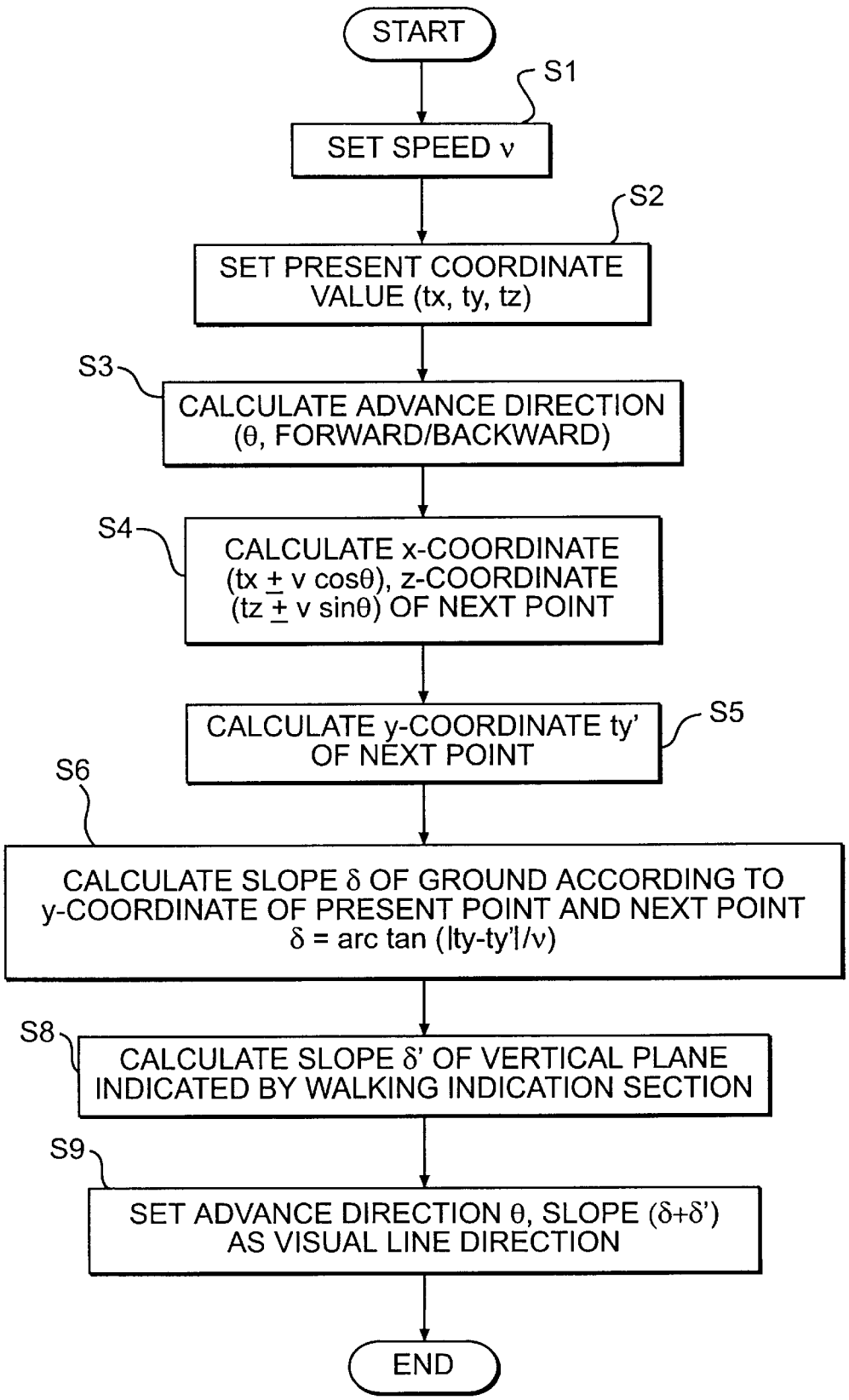
FIG. 8 is another flow chart of processing of the visual line direction determination section according to the first embodiment.

In the first embodiment, the walking indication section 5 indicates the angle θ on horizontal plane and the advance direction. However, it may be possible that the visual line direction calculated by processing of FIG. 5 is corrected by angle along vertical direction. FIG. 8 is a flow chart of processing of this modified embodiment. In FIG. 8, all steps except for S8 and S9 are same as the steps of FIG. 5. A slope δ' along the vertical plane indicated by the walking indication section 5 is read from the background memory section 2 (S8) and determines the visual line direction ( θ, δ+δ') by adding the slope δ' to a slope δ calculated at S6 (S9). In this way, the background data stored in the background memory section 2 is changed according to the season. For example, in winter, the background on which snow lies is set by the control angle δ' on the vertical plane. In autum, the background on which fallen leaves are piled is set by the control angle δ'' on the vertical plane. By changing the control angle, a seasonal feeling is represented in the background.

Figure 9:
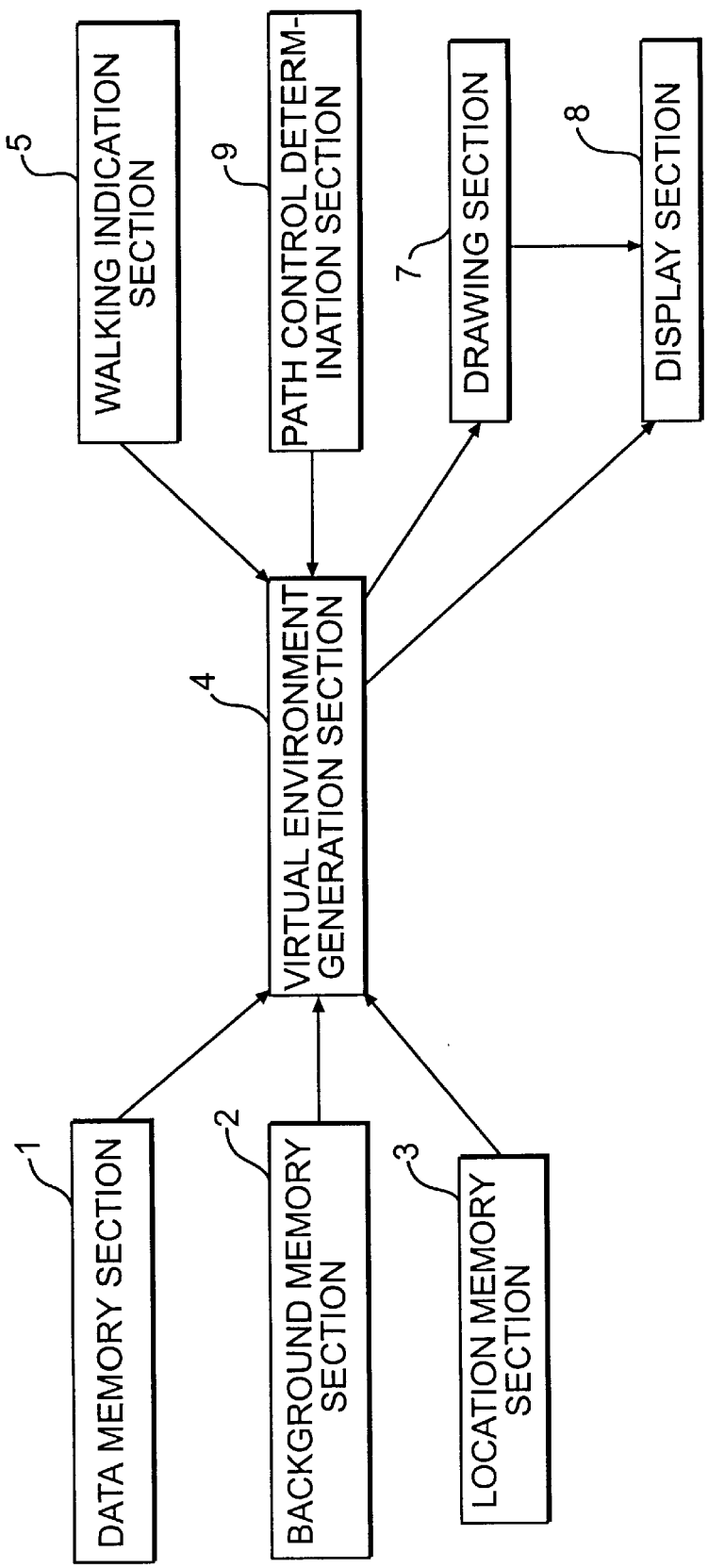
FIG. 9 is a block diagram of the information presentation apparatus according to a second embodiment for the present invention.
Figure 10:
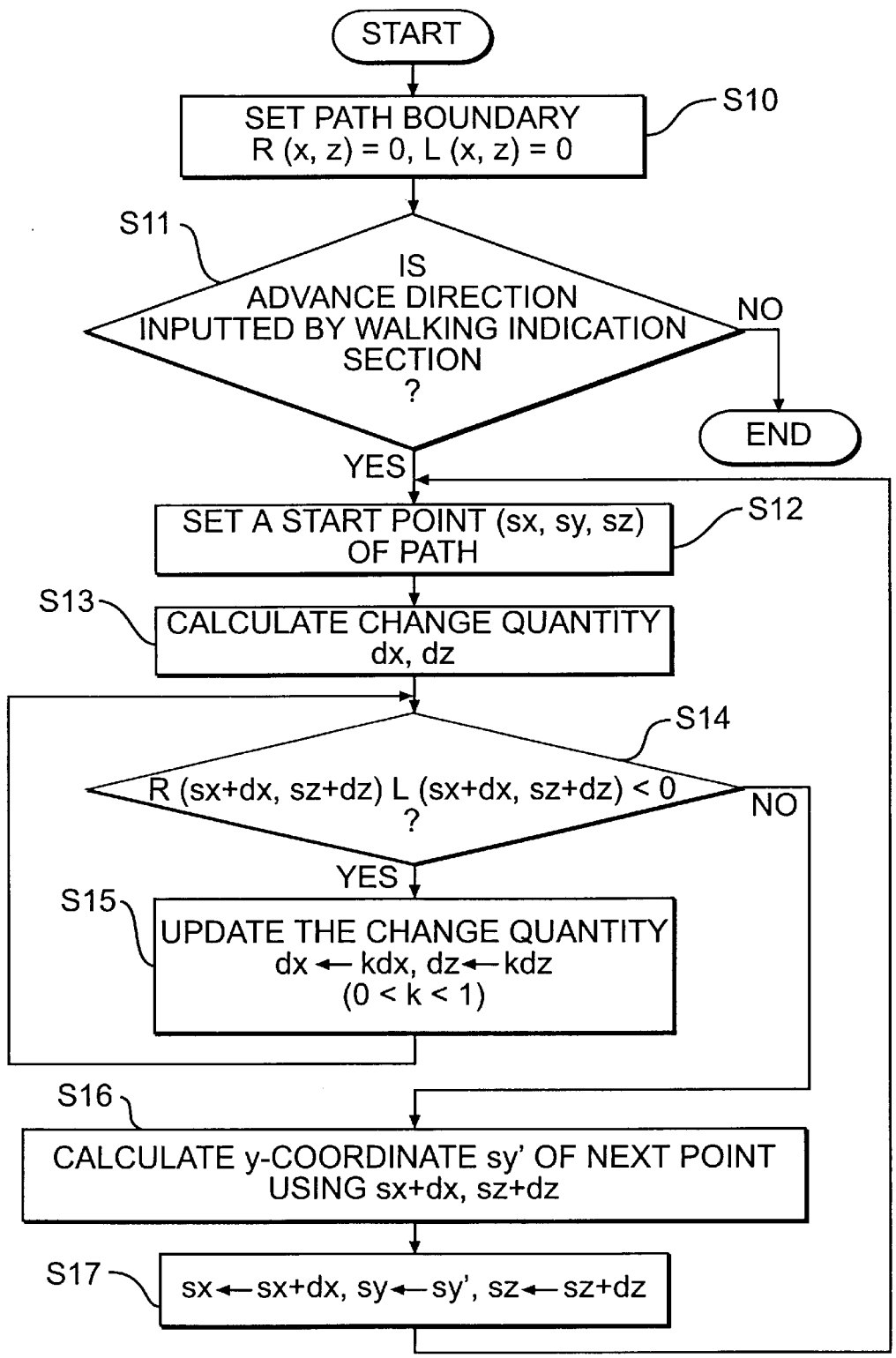
FIG. 10 is a flow chart of processing of path control determination section according to the second embodiment.

The second embodiment of the present invention is the information presentation apparatus to contol the walking path which the avator (view position) can easily approach to desired object in the virtual environment. FIG. 9 is a block diagram of the information presentation apparatus according to the second embodiment. The information presentation apparatus is comprised of the data memory section 1, the background memory section 2, the location memory section 3, the virtual environment generation section 4, the walking indication section 5, the drawing section 7, the display section 8 and a path control determination section 9. The path control determination section 9, which is the only different section from the first embodiment of FIG. 1, previously stores a path along which the avator is walking in the virtual environment and controls the advance direction indicated by the walking indication section 5 not to turn away from the path. FIG. 10 is a flow chart of processing of the path control determination section 5.

Figure 11:
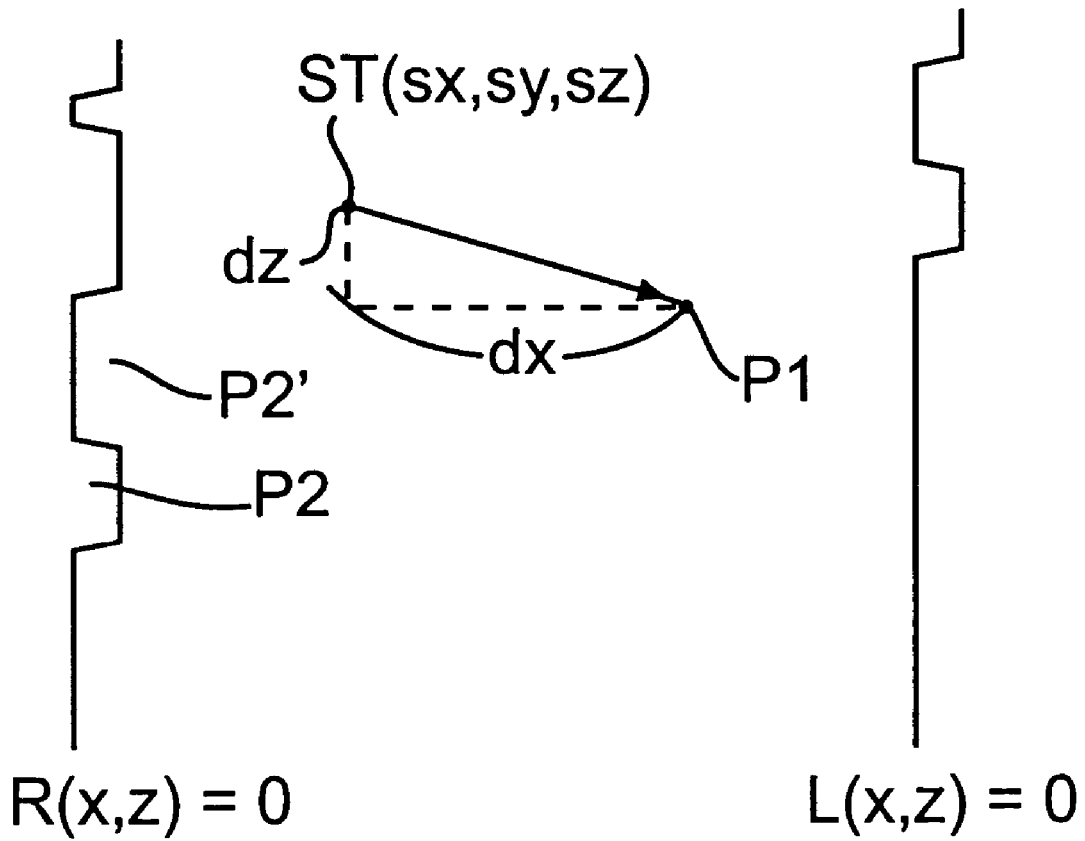
FIG. 11 is a schematic diagram showing a process of the path control determination section according to the second embodiment.

First, one path boundary R (x,z)=0 and the other path boundary (x,z)=0 for predetermined path on xz plane are set (S10). FIG. 11 is an example of the path boundaries on xz plane. If the advance direction is inputted by the walking indication section 5 (S11), a start point (sx,sy,sz) to begin the walk through is set as shown in FIG. 11 (S12). The advance direction (an arrow of solid line in FIG.11) on xz plane is calculated as change quantity (dx,dz) according to the walking speed v (S13). Next, new point $P_1$ advanced (dx,dz) from the start point ST is decided to be included in the path area between the one path boundary R (x,y) and the other path boundary L (x,z) (S14). The following equation is used.

$$R\ (sx+dx,sz+dz)\ L(sx+dx,sz+dz)<0$$

If the above equation is not satisfied (for example, a point $P_2$ in FIG. 11), the change quantity (dx,dz) is reduced (s15). For example, the change quantity (dx,dz) is updated by multiplieation constant k (0<k<1) to (dx,dz) as follows.

$$dx \leftarrow kdx,\ dz \leftarrow kdz (0<k<1)$$

The change method may be subtraction a predetermined number from (dx,dz). As a result, the point $P_2$ is moved to a point $P_2$' in FIG. 11. Then, the new point $P_2$' is repeatedly decided to be included in the path area (S14). If the new point $P_2$' is not included in the path area, the new change quantity (dx,dz) is repeatedly updated by the multiplieation (S15). In short, the processings S14 and S15 are repeated until the new point is included in the path area. Inspite of repeatedly processing S14 and S15, if the new point is not included in the path area, the change quantity dx,dz) may be changed to "0" compulsory. In the example of FIG. 11, the point $P_2$' is included in the path area. Therefore, processing of step S16 is executed. The point $P_1$ is also included in the path area. Therefore, in this case, processing of step S16 is executed. In this way, the moved point (sx+dx,sz+dz) is included in the path area, y-coordinate sy' of the moved point is calculated using "sx+dx,sz+dz" (S16). In example of FIG. 11, y-coordinate of the point $P_1$ or the point $P_2$' is calculated. Then, the coordinate (sx+dx,sy',sz+dz) is set as present point (sx,sy,sz) and repeats processings S12~S17 are repeated. In example of FIG. 11, the point $_1$ or the point $P_2$' is set as the start point and the processings from S11 are repeated (S17).

As mentioned-above, the path control determination section 9 controls the advance direction indicated by the user not to turn over from the predetermined path in the virtual environment. Therefore, the avator (the user) can easily approach (watch) to his/her desired object in the virtual environment. Additionally, virtual environment data except for the path area is simplified. Therefore, data quantity of the virtual environment is greatly reduced in memory section.

In the second embodiment, the coefficient k is constant value. However, the coefficient k may be changed as smaller value. For example, in same way of the first embodiment, in case of the situation in which snow lies in winter, the virtual environment neighbor to the path is displayed in white color. Therefore, it often happens that the path area is not visible. In this case, the coefficient k is set as smaller value. It is possible that the advance direction is not much more turned over from the predetermined path.

Next, the third embodiment of the present invention will be explained. In the first and second embodiments, the user indicates the view position and the advance direction to the display on which the virtual environment is outputted. In this method, view area which is visible from the view position in the virtual environment is only displayed. Therefore, the user can not understand the location of the view area in the virtual environment. Additionally, in the virtual environment displayed on a big screen of the museum, the view area of one visitor is only displayed on screen at one time. Therefore, other visitors must watch the view area of the one visitor on the big screen commonly used. The third embodiment of the present invention resolves the mentioned-above problem.

Figure 12:
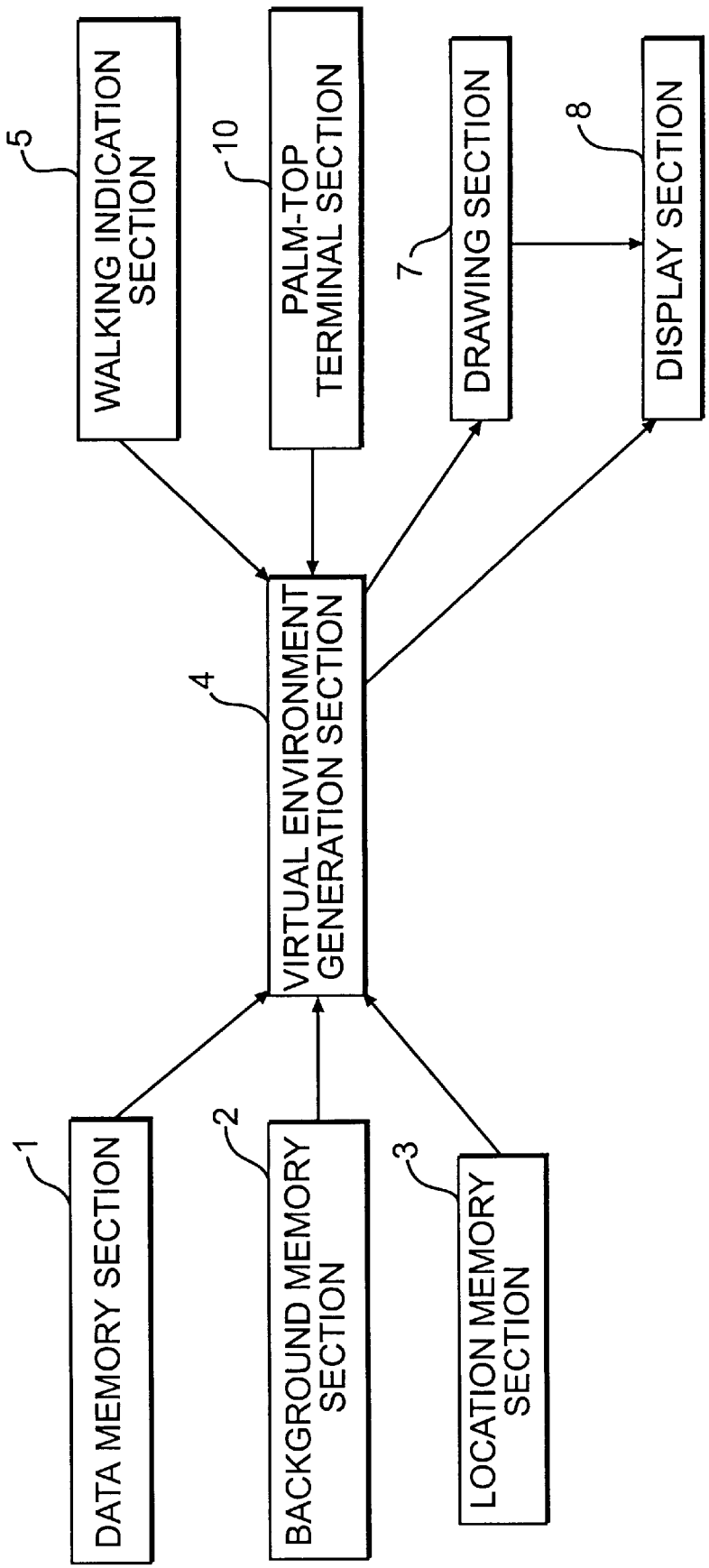
FIG. 12 is a block diagram of the information presentation apparatus according to a third embodiment of the present invention.
Figure 13:
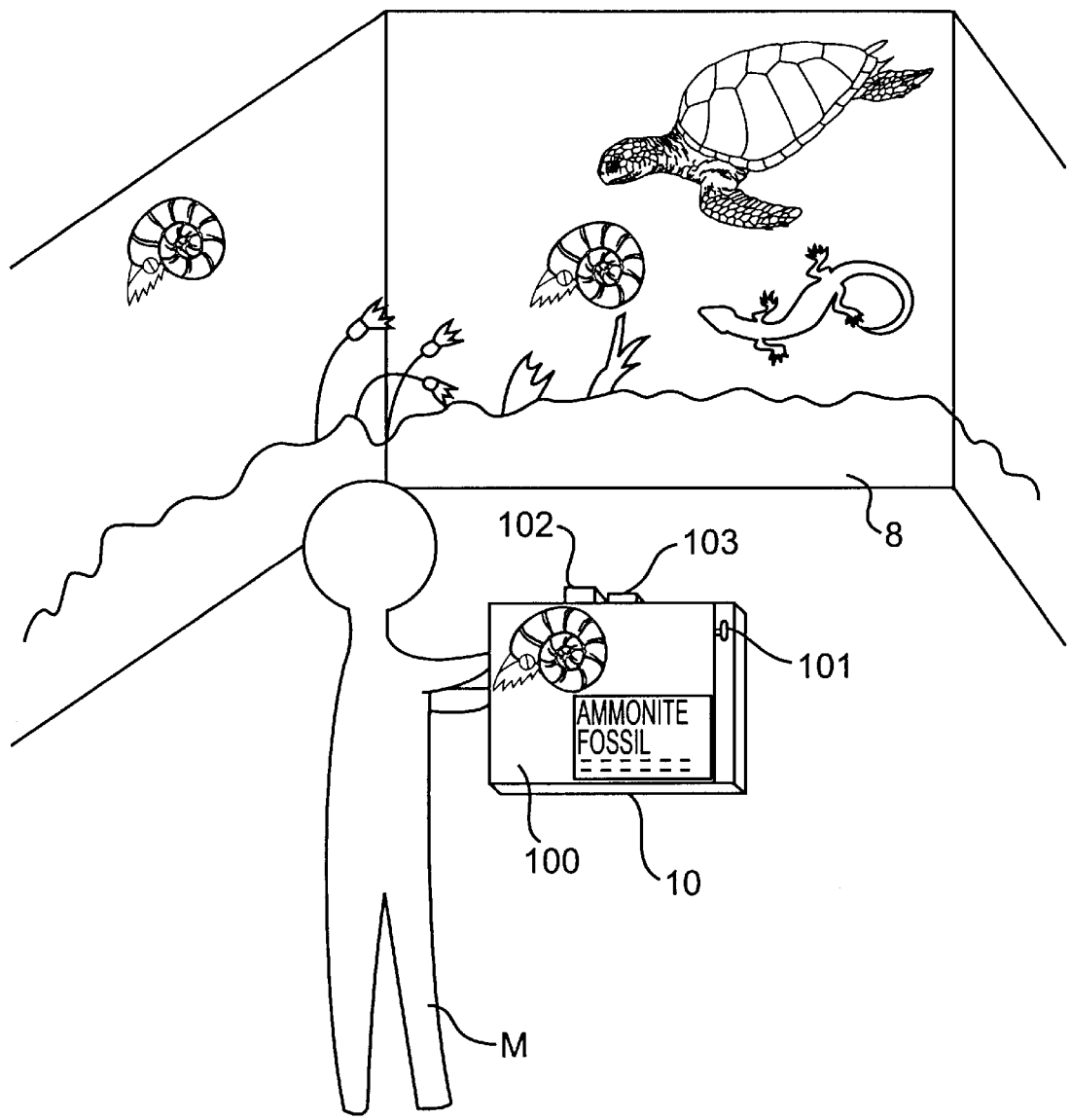
FIG. 13 is a schematic diagram showing process of a palm-top terminal section according to the third embodiment.

FIG. 12 is a block diagram of the information presentation apparatus according to the third embodiment. The information presentation apparatus of the third embodiment is comprised of the data memory section 1, the background memory section 2, the location memory section 3, the virtual environment generation section 4, the walking indication section 5, the drawing section 7, the display section 8 and a palm-top terminal section 10. Each section except for the palm-top terminal section 10 are same as the first embodiment in FIG. 1. The display section 8 may be a big screen surrounding the visitors as inside wall of the room. FIG. 13 is a schematic diagram of the situation of the palm-top terminal section 10 and the display section 8. As shown in FIG. 13, each user M has the palm-top terminal section 10. When the virtual environment is outputted on the display section 8, position of the user M is detected as three-dimensional position in the virtual environment and the detail information of the object in the user M's view area is displayed on the palm-top terminal section 10 according to the user M's indication. In FIG. 13, the palm-top terminal section 10 is comprised of a display 100, indication switch 101, magnetic position sensor 102 to detect three-dimensional position of the user M, transmitter and receiver 103 to communicate to the virtual environment generation section 4 by wireless. The user M has the palm-top terminal section 10 while he is walking around the display section 8. The three-dimensional virtual environment of the ancient deep sea is drawn and displayed on the screen as shown in FIG.13. The position sensor 102 of the palm-top terminal section 10 detects the three-demensional position of the user M and the transmitter 103 sends the position (x,y,z) to the virtual environment generation section 4.

Figure 14:
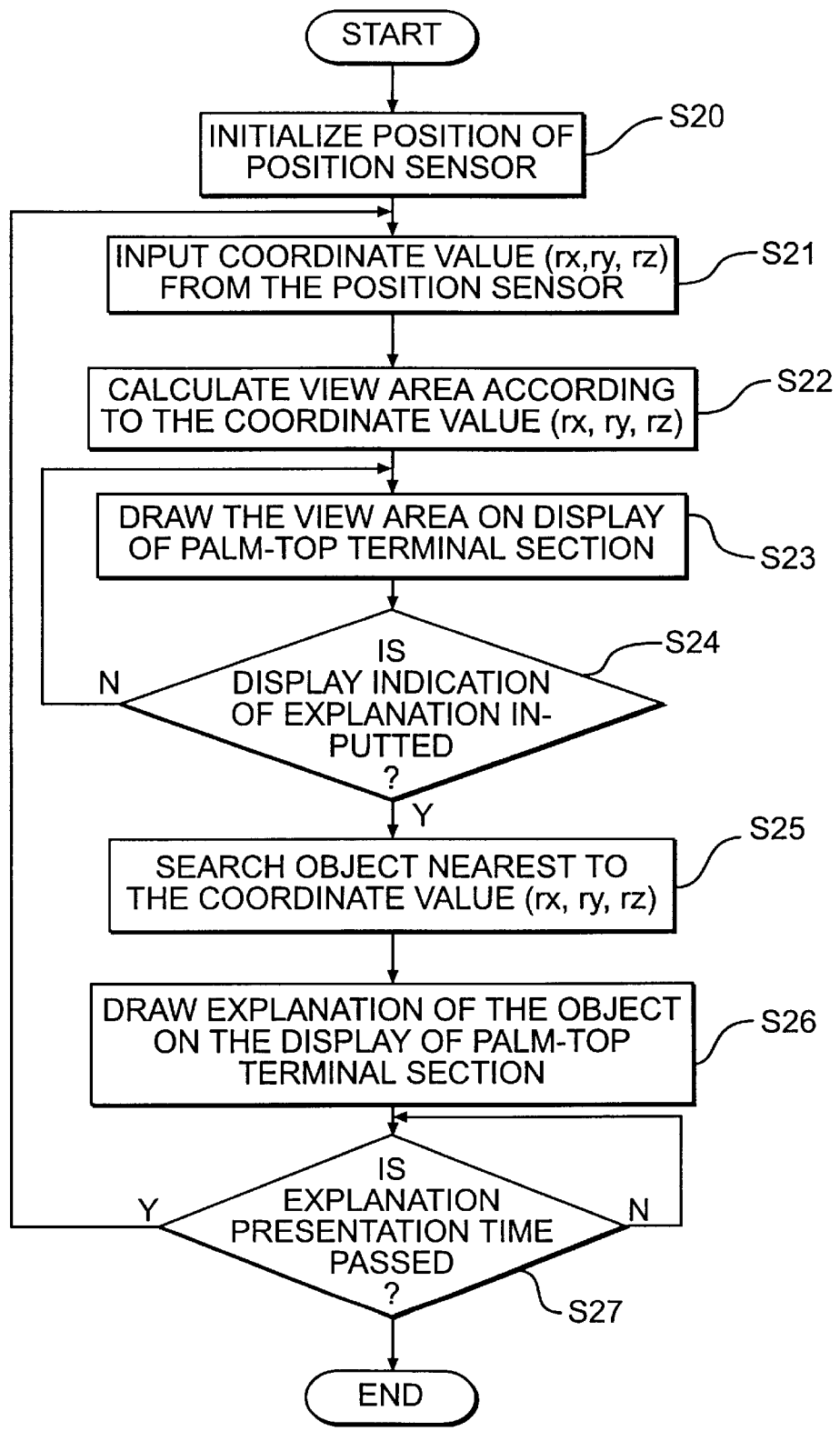
FIG. 14 is a flow chart of processing of a virtual environment generation section according to the third embodiment.

FIG. 14 is a flow chart of processing of the virtual environment generation section 4 in case of using the palm-top terminal section 10. First, the position detected by the position sensor 102 is initialized (S20). Next, present position (rx,ry,rz) of the user M detected by the position sensor 102 is sent from the transmitter 103 to the virtual environment generation section 4 (S21). The virtual environment generation section 4 calculates a view area in which the center position is (rx,ry,rz) is set in the three-dimensional virtual environment and decides which objects are included in the view area. For example, the effective view area is formed within upper and lower 20°, right and left 20°. The drawing section 7 draws the objects which are decided to be included in the view area and the image data as drawn result is sent to the palm-top terminal section 10 to display (S23). In this way, the drawn object corrsponding to the view area is outputted on the display 100 of the palm-top terminal section 10. If the user M wants to watch the explanation of the displayed object, he/she selects and turns on the indication switch 101 (S24). In this case, the virtual environment generation section 4 decides that the explanation of the object on the display 100 is required by the user. First, the object nearest to the center position (rx,ry,rz) of the display 100 is searched (S25). The explanation (text data) of the searched object is retrieved from the data memory section 1 and sent to the palm-top terminal section 10. The palm-top terminal section 10 draws the explanation in addition to the object on the display 100 as shown in FIG. 13 (S26). In this case, narration by voice may be outputted through speaker of the palm-top terminal section 10. When a predetermined time is passed from the start time of explanation, displaying of the explantion finishes (S27). Otherwise, by pushing the indication switch 101 by the user, the displaying of the explanation may finish. After finishing the displayed explanation, the coordinate value of the position of the user M is detected again and the processings S22~S27 are executed repeatedly.

As mentioned above, in the third embodiment, while the virtual environment is commonly displayed on one screen, each visitor can watch the explanation of his/her desired object using the palm-top terminal section 10. In this case, the explanation is only displayed on the palm-top terminal section 10 of the user M who required the explanation. Therefore, the displayed explanation does not disturb the other visitors.

The explanation may be previously divided to the summarized explanation and the detail explanation. As for the first indication to the explanation, the summalized explanation is only displayed. When the indication switch 101 is turned on again, the detail explanation is displayed.

Figure 15:
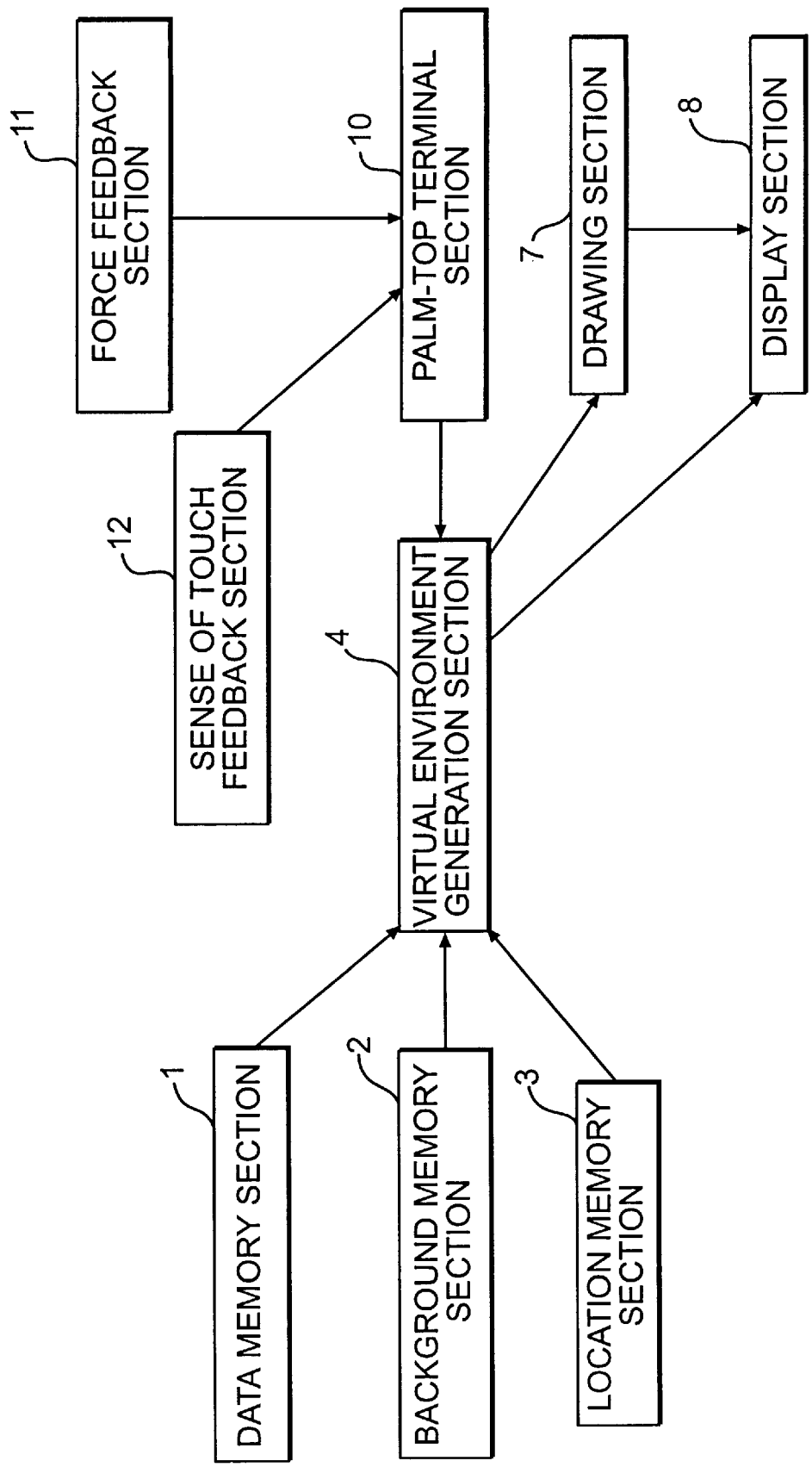
FIG. 15 is another block diagram of the information presentation apparatus according to the third embodiment.

FIG. 15 is another block diagram of the information presentation apparatus according to the third embodiment. In this block diagram, a force feedback section 11 or a sense of touch feedback section 12 is combined to the palm-top terminal section 10. The force feedback section 11 feedbacks weight of the object as power to the palm-top terminal section 10 as if the user touches the object by his/her hand.

Figure 16:
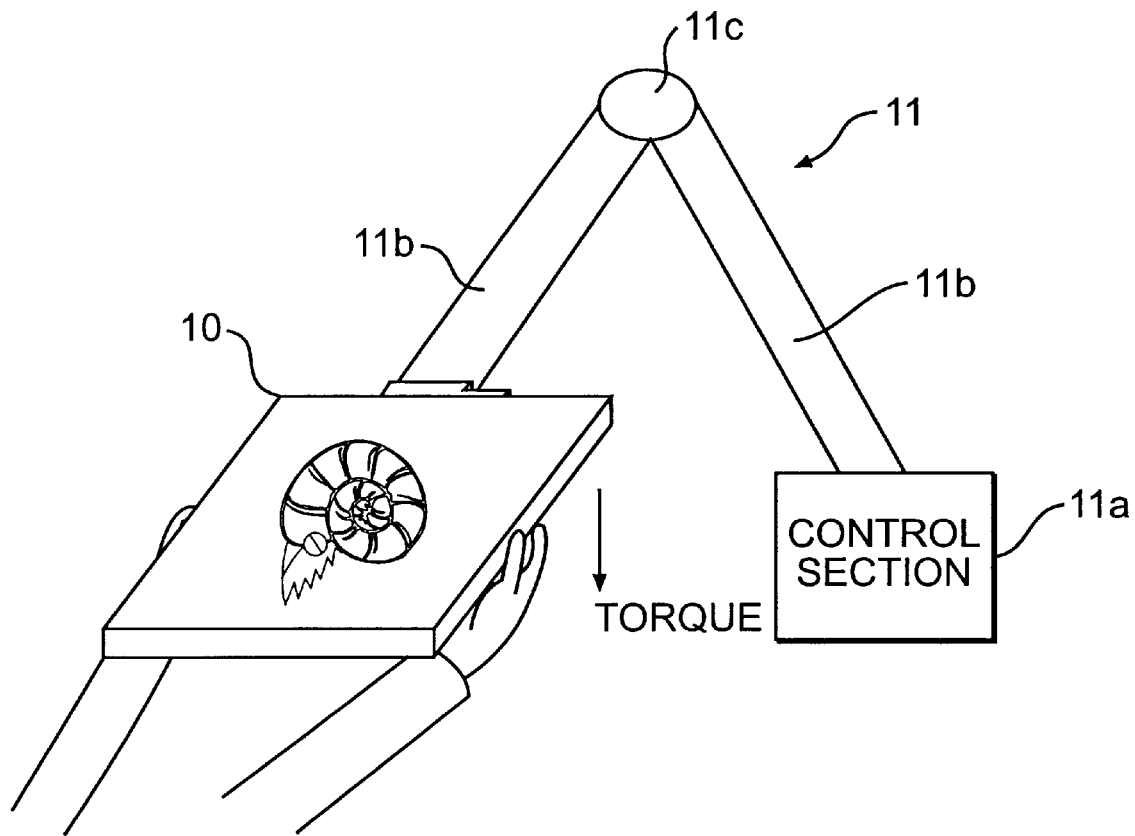
FIG. 16 is a schematic diagram of a force feedback section according to the third embodiment.

FIG. 16 is a schematic diagram of configuration of the force feedback section 11. As shown in FIG. 16, an arm 11b of the force feedback section 11 is connected to the palm-top terminal section 10. In this configuration, when the indication to the explanation is supplied from the palm-top terminal section 10, the virtual environment generation section 4 retrieves the explanation and weight data of the object from the data memory section 1 and sends them to the palm-top terminal section 10. The palm-top terminal section 10 sends the weight data to the force feedback section 11. Under the control of a control section 11a, torque generation section 11c generates torque corresponding to the weight. The torque is supplied to the palm-top terminal section 10 through the arm 11b. Therefore, the user feels the weight as if he lifts the object.

Figure 17:
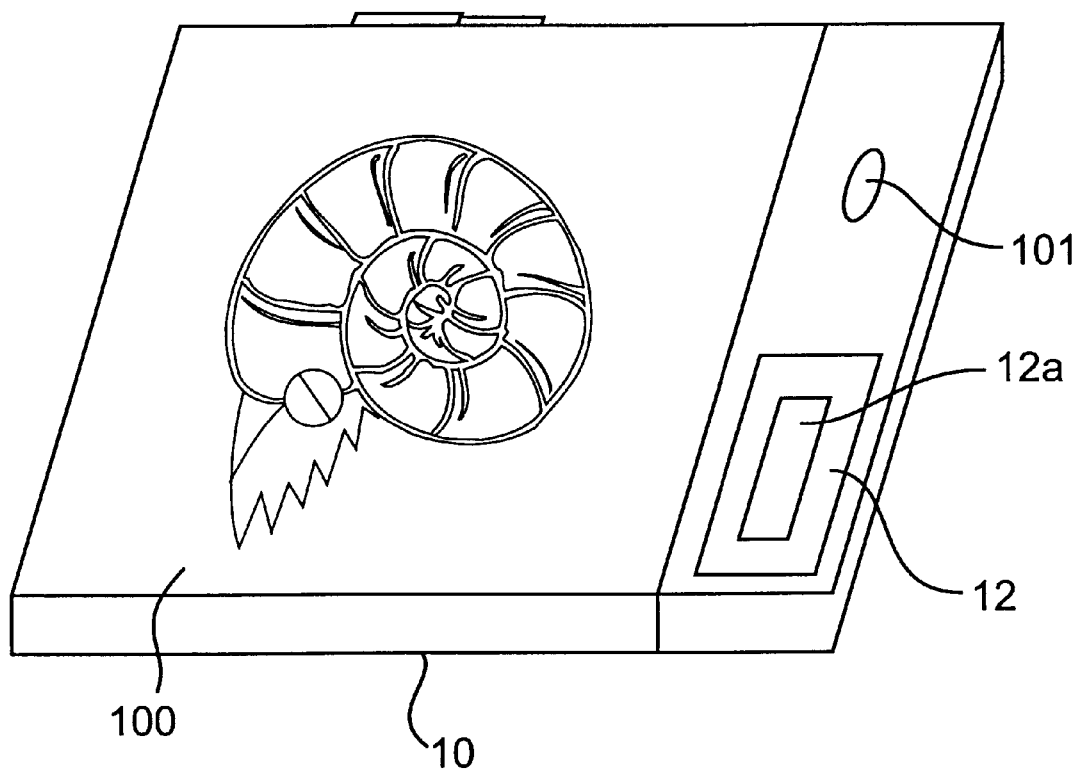
FIG. 17 is a schematic diagram of a sense of touch feedback section according to the third embodiment.

The sense of touch feedback section 12 feedbacks sense of touch of the object to the hand operation section 10. The sense of touch is, for example, rough or smooth degree on surface of the object. FIG. 17 is a schematic diagram of composition of the sense of touch feedback section 12. As shown in FIG. 17, the sense of touch feedback section 12 is connected to the palm-top terminal section 10. In this composition, when the indication to the explanation is supplied form the palm-top terminal section 10, the virtual environment generation section 4 retrieves the explanation and sense of touch data from the data memory section 1 and sends them to the palm-top terminal section 10. The palm-top terminal section 10 sends the sense of touch data to the sense of touch feedback section 12. The shake section 12a shakes according to the sense of touch data. When the user touches the shake section 12a by his/her hands, he/she can feel the sense of touch of the object as if he/she touches the object by his/her hand.

Figure 18:
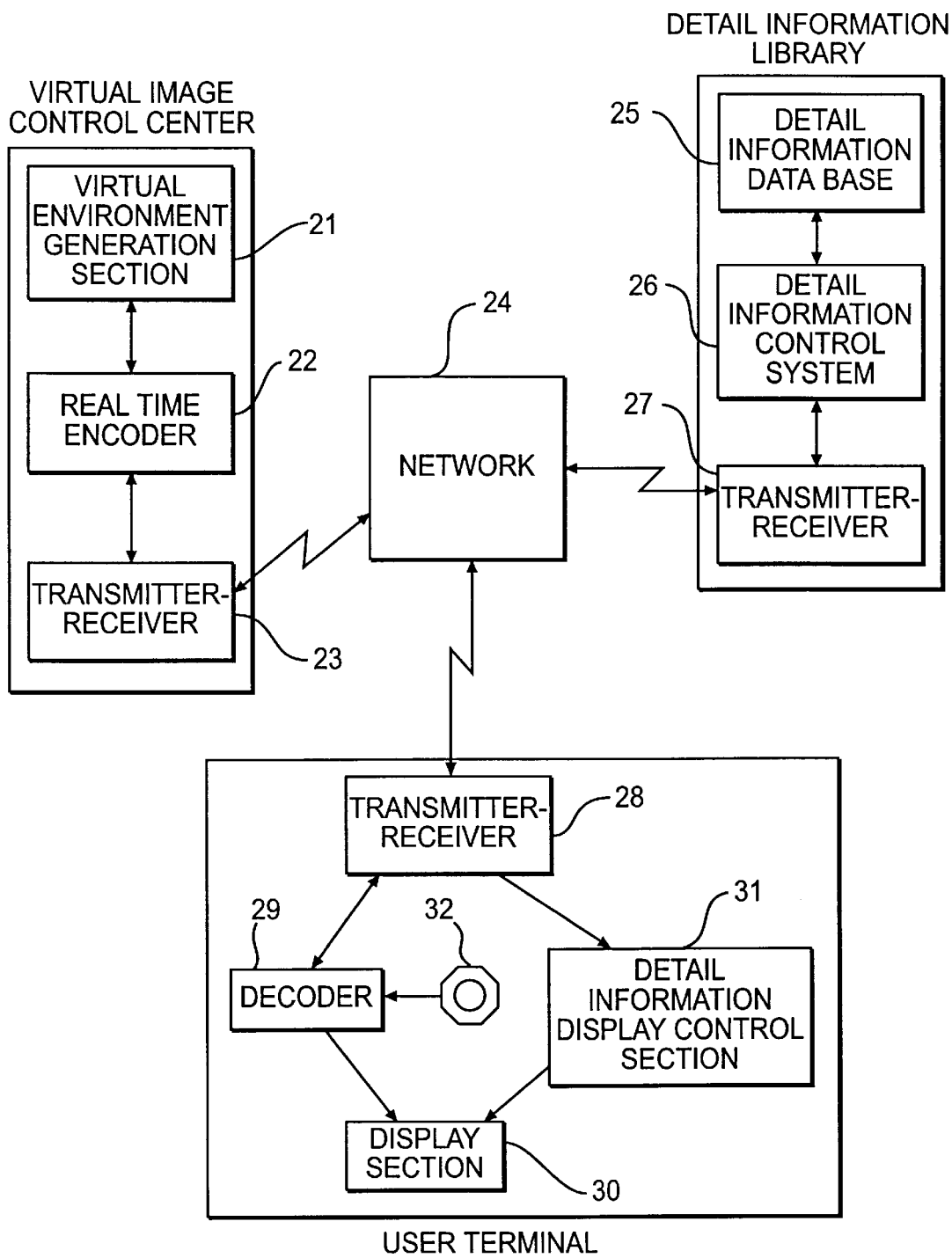
FIG. 18 is a block diagram of the information presentation apparatus according to a fourth embodiment of the present invention.

Next, the fourth embodiment of the present invention will be explained. In the fourth embodiment, a virtual image control center and a detail information library are located away from a user terminal. FIG. 18 is a block diagram of the present information system of the fourth embodiment. The virtual image control center, the detail information library, a user terminal are connected by a network 24. The virtual image control center is comprised of a virtual environment generation section 21, a real time encoder 22 and transmitter-receiver 23. The virtual environment generation section 21 includes the data memory section 1, a background memory section 2 and a location memory section 3. In the same way as the first embodiment, the virtual environment generation section 21 generates the three dimensional virtual environment using data stored in memory section 1,2,3. The real time encoder 22 encodes the virtual environment data when the virtual environment data is transmitted to the user terminal through the transmitter 23. The transmitter-receiver 23 is connected to the network 24. The detail information library is comprised of a detail information data base 25, a detail information control section 26 and a transmitter-receiver 27. The detail infrormation data base 25 previously stores detail information (for example, text data of each object, the weight of each object, the power of each object, the sound of each object, the sense of touch of each object, or the detailed shape of each object). The detail information control section 26 retrieves the detail information of the object according to the indication from the user terminal. The transmitter-receiver 27, connected to the network 24, transmittes the detail information to the network 24. The user terminal is comprised of transmitter-receiver 28, a decoder 29, a display section 30, a detail information display control section 31, an input device 32. The transmitter-receiver 28, connected to the network 24, receives the virtual environment data from the virtual image control center or the detail information from the detail information library. The decoder 29 decodes the encoded virtual environment. The display section 30 displays the decoded virtual environment to the user. The detail information display control section 31 receives the detail information through the receiver 28 and controls to display the detail information on the display section 30.

Figure 19:
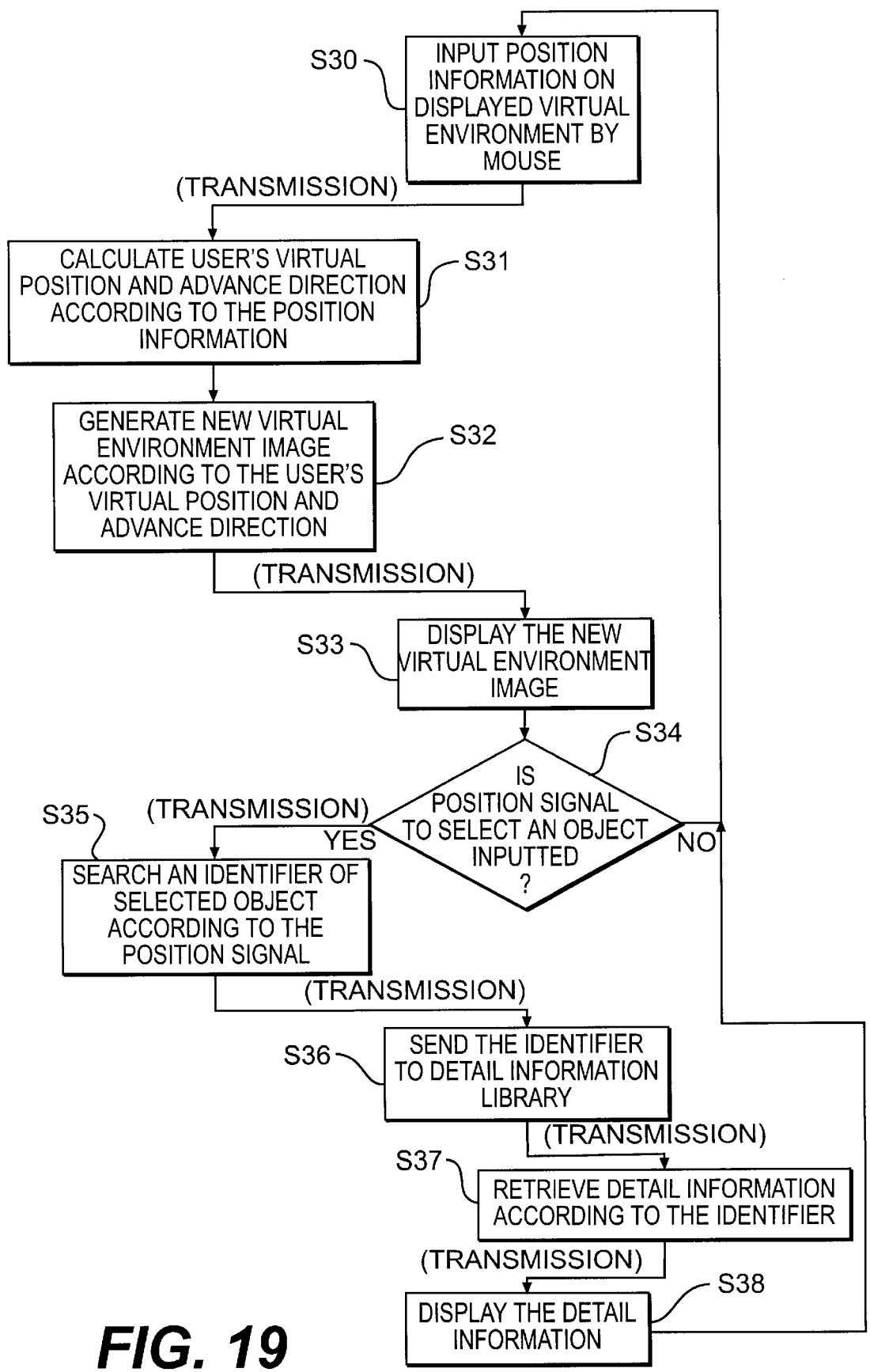
FIG. 19 is a flow chart of processing of the information presentation apparatus according to the fourth embodiment.

FIG. 19 is a flow chart of processing of the information presentation system of the fourth embodiment. Assume that the virtual environment is displayed on the display section 30 of the user terminal. In this case, the user inputs position information (view position and advance direction ) in the displayed virtual environment by the input device 32 in same way of the first embodiment (S30). The position information is sent to the virtual image control center through the transmitter 28. The virtual environment generation section 21 receives the position information through the receiver 23, and calculates the virtual position and the advance direction in the three dimensional virtual environment according to the position information (31). The virtual environment generation section 21 generates new virtual environment image according to the virtual position and the advance direction (S32). The new virtual environment image is encoded by the real time encoder 22 and sent to the user terminal through the transmitter 23. In the user terminal, the encoded new virtual environment image is received by the receiver 28 and decoded by the decoder 29. The decoded new virtual environment image is displayed through the display section 30 (S33). In this situation, assume that the user selects one object in the displayed virtual environment by the input device because he/she wants to read the explanation of the one object or watch the object image in detail(S34). The position signal of the one object is sent to the virtual image control center through the transmitter 28. The virtual environment generation section 21 receives the position signal through the receiver 23. The virtual environment generation section 21 determines the object corresponding to the position signal in the three dimensional virtual environment according to the position coordinate. In this place, the object data memory section shown in FIG. 2 is stored in the virtual environment generation section 21. After determining the object, the virtual environment generation section 21 searches an identifier of the determined object by referring to the object data memory section (S35). The identifier is sent to the user terminal through the transmitter 23. The transmitter/receiver 28 of the user terminal receives the address and sends the address to the detail information library (S36). The detail information control section 26 receives the address through the reciever 27. In this place, the detail information data base 25 previously stores the detail information corresponding to each object address. Therefore, the detail information control section 26 retrieves the detail information (explanation of the object or the detail image of the object) corresponding to the address from the detail information data base 25 (S37). The detail information control section 26 sends the detail information to the user terminal through the transmitter 27. In the user terminal, the detail information display control section 31 receives the detail information through the receiver 28 and controls the display section 30 to output the detail information in addition to the displayed virtual environment. In this place, it is not necessary that the detail information is limited to the text data (explanation). The detail information may be a detail image of the object, or sound explantion of the object.

As mentioned above, in the fourth embodiment, the virtual environment image is encoded at real time and transmitted from the virtual image control center to the user terminal. Therefore, inspite of simple user terminal being far from the virtual image control center, the user terminal can access the virtual environment data generated in the virtual image control center.

In addition to this, the detail information of each object is stored in the detail information data base 25 different from the virtual image control center. Therefore, it is not necessary to change the detail information. Only if location of the virtual environment is changed on the display section 30 of the user terminal, the user can watch various kind of the virtual environment and the detail information of the objects included in the virtual environment.

A memory can be used to store instructions for performing the processes described above, where such a memory can be CD-ROM, floppy disk or the like.

Other embodiments of the invention will be apparent to those skilled in the art from consideration of the specification and practice of the invention disclosed herein. It is intended that the specification and examples be considered as exemplary only, with the true scope and spilit of the invention being indicated by the following claims.

What is claimed is:

1. Information presentation apparatus, comprising:

data memory means for storing shape data of objects to be presented;

background memory means for storing shape data of a virtual environment to be presented;

location memory means for storing location data of the objects in the virtual environment;

virtual environment generation means for generating the virtual environment in which the objects are located in accordance with the shape data of objects, the shape data of the virtual environment, and the location data;

indication means for indicating a position and a walking direction of a user watching the virtual environment;

visual line direction determination means for determining a visual line along a slope of a virtual ground in the virtual environment according to the position, the walking direction and the shape data of the virtual ground; and display means for displaying the virtual environment in accordance with the position and the visual line.

2. Information presentation apparatus, according to claim 1,
wherein said data memory means stores an object name, a shape attribute, a coordinate of shape of the object and a detail data address for each object,
wherein said background memory means stores background, content data address and depth information in virtual space for each background, and
wherein said location memory means stores shape data address of the object, coordinate, posture and scaling as location data for each object in the virtual environment.

3. Information presentation apparatus, according to claim 2,
wherein said indication means indicates an (x,y,z) coordinate value of the user's present position and walking speed as the walking direction in the virtual environment.

4. Information presentation apparatus, according to claim 3,
wherein said visual line direction determination means calculates an (x,y,z) coordinate value of the user's next position in accordance with the coordinate value of the user's present position, the walking direction and virtual ground, and calculates a slope of the virtual ground in accordance with the y-coordinate of the user's present position and next position, and wherein the walking direction and the slope are the visual line direction.

5. Information presentation apparatus, comprising:
data memory means for storing shape data of objects to be presented;
background memory means for storing shape data of a virtual environment to be presented;
location memory means for storing location data of the objects in the virtual environment;
virtual environment generation means for generating the virtual environment in which the objects are located in accordance with the shape data of objects, the shape data of the virtual environment, and the location data;
detail information memory means for storing detail information of the objects;
display means for displaying the virtual environment generated by said virtual environment generation means;
position sensor means for sending a coordinate value of a user's position in the virtual environment;
operation means for indicating presentation of detail information of a selected object corresponding to the coordinate value of the user's position in the virtual environment; and
presentation means for presenting the selected object and the detail information.

6. Information presentation apparatus, according to claim 5,
wherein said virtual environment generation means searches for the object nearest to the coordinate value of the user's position in the virtual environment in accordance with the location data in said location memory means.

7. Information presentation apparatus, according to claim 5,
wherein said detail information comprises text information.

8. Information presentation apparatus, according to claim 5,
further comprising force feedback means for feedbacking force corresponding to weight of the selected object to present through said presentation means, and said detail information comprises weight information.

9. Information presentation apparatus, according to claim 5,
further comprising sense of touch feedback means for feedbacking a sense of touch corresponding to the selected object to present through said presentation means, and said detail information comprisres sense of touch information.

10. Information presentation apparatus, comprising:
virtual image control means includings means for generating a virtual environment in accordance with object data and virtual space data, means for encoding the virtual environment generated by said generating means and means for transmitting the virtual environment encoded by said encoding means;
detail information memory means including means for storing detail information of each object in the virtual environment, means for retrieving the detail information of each object from said storing means, and means for transmitting the detail information retrieved by said retrieving means; and
user terminal means including means for decoding the encoded virtual environment transmitted by said virtual image control means, means for displaying the virtual environment decoded by said decoding means, and means for inputting a position signal to select an object in the virtual environment displayed by said displaying means;
wherein generating means in said virtual image control means searches for an identifier of a selected object from the object data in accordance with the position signal transmitted by said user terminal means, the identifier of the selected object being transmitted from said virtual image control means to said detail information memory means through said user terminal means,
wherein retrieving means in said detail information memory means retrieves the detail information of the selected object from said storing means in accordance with the identifier, the detail information being transmitted to said user terminal means, and
wherein displaying means in said user terminal means displays the detail information in addition to the displayed virtual environment.

11. Information presentation apparatus, according to claim 10,
further comprising network means for mutually interconnecting said virtual image control means, said detail information memory means and said user terminal means.

12. A method for presenting information, comprising the steps of:
generating a virtual environment in which objects are located in accordance with shape data of the objects, shape data of the virtual environment, and location data;
indicating a position and a walking direction of a user watching the virtual environment;
determining a visual line along a slope of a virtual ground in the virtual environment according to the position, the walking direction and the shape data of the virtual ground; and displaying the virtual environment in accordance with the position and the visual line.

13. A method for presenting information, comprising the steps of:

generating a virtual environment in which objects are located in accordance with shape data of the objects, shape data of the virtual environment and location data;

storing detail information of each object;

displaying the virtual environment generated at the generating step;

sensing a coordinate value of a user's position in the virtual environment;

indicating presentation of detail information of a selected object corresponding to the coordinate value of the user's position in the virtual environment; and presenting the selected object and the detail information for the user.

14. A method for presenting information, comprising the steps of:

generating a virtual environment in accordance with objects data and virtual space data in a virtual image control section;

encoding the virtual environment generated at the generating step;

transmitting the virtual enviroment encoded at the encoding step from the virtual image control section to a user terminal;

decoding the encoded virtual environment transmitted from the virtual image control section;

displaying the virtual environment decoded at the decoding step in the user terminal;

inputting a position signal to select an object in the virtual environment displayed at the displaying step in the user terminal;

transmitting the position signal from the user terminal to the virtual image control section;

searching for an identifier of a selected object from the object data in accordance with the position signal in the virtual image control section;

transmitting the identifier of the selected object from the virtual image control section to a detail information memory section through the user terminal;

retrieving the detail information of the selected object in accordance with the identifier in the detail information memory section;

transmitting the detail information from the detail information memory section to the user terminal; and displaying the detail information in addition to the displayed virtual environment in the user terminal.

15. A computer readable memory containing computer-readable instructions, comprising:

instruction means for causing a computer to generate a virtual environment in which objects are located in accordance with shape data of the objects, shape data of the virtual environment, and location data;

instruction means for causing a computer to indicate a position and a walking direction of a user watching the virtual environment;

instruction means for causing a computer to determine a visual line along a slope of a virtual ground in the virtual environment according to the position, the walking direction in the virtual environment and the shape data of the virtual ground; and instruction means for causing a computer to display the virtual environment in accordance with the position and the visual line.

16. A computer readable memory containing computer-readable instructions, comprising:

instruction means for causing a computer to generate a virtual environment in which objects are located in accordance with shape data of the objects, shape data of the virtual environment, and location data;

instruction means for causing a computer to store detail information of each object;

instruction means for causing a computer to display the virtual environment;

instruction means for causing a computer to sense a coordinate value of a user's position in the virtual environment;

instruction means for causing a computer to indicate presentation of detail information of a selected object corresponding to the coordinate value of the user's position in the virtual environment; and instruction means for causing a computer to present the selected object and the detail information for the user.

17. A computer readable memory containing computer-readable instructions, comprising:

instruction means for causing a computer to generate a virtual environment in accordance with object data and virtual space data in a virtual image control section;

instruction means for causing a computer to encode the virtual environment generated at the generating step;

instruction means for causing a computer to transmit the virtual enviroment encoded at the encoding step from the virtual image control section to a user terminal;

instruction means for causing a computer to decode the encoded virtual environment transmitted from the virtual image control section;

instruction means for causing a computer to display the virtual environment decoded at the decoding step in the user terminal;

instruction means for causing a computer to input a position signal to select an object in the virtual environment displayed at the displaying step in the user terminal;

instruction means for causing a computer to transmit the position signal from the user terminal to the virtual image control section;

instruction means for causing a computer to search for an identifier of a selected object from the object data in a accordance with the position signal in the virtual image control section:

instruction means for causing a computer to transmit the identifier of the selected object from the virtual image control section to a detail information memory section through the user terminal;

instruction means for causing a computer to retrieve the detail information of the selected object in accordance with the identifier in the detail information memory section;

instruction means for causing a computer to transmit the detail information from the detail information memory section to the user terminal; and instruction means for causing a computer to display the detail information in addition to the displayed virtual environment in the user terminal.

* * * * *

UNITED STATES PATENT AND TRADEMARK OFFICE
CERTIFICATE OF CORRECTION

PATENT NO. : 5,917,495
DATED : June 29, 1999
INVENTOR(S) : Miwako DOI et al.

It is certified that error appears in the above-identified patent and that said Letters Patent is hereby corrected as shown below:

Claim 9, Col. 14, line 10, "comprisres" should read --comprises--.

Claim 10, Col. 14, line 13, "includings" should read --including--.

Claim 14, Col. 15, line 27, "enviroment" should read --environment--.

Claim 17, Col. 16, line 32, "enviroment" should read --environment--.

Claim 17, Col. 16, line 49, after "data in", delete "a".

Signed and Sealed this

Fifteenth Day of February, 2000

*Attest:*

Q. TODD DICKINSON

*Attesting Officer*   *Commissioner of Patents and Trademarks*